United States Patent
Jha et al.

(10) Patent No.: US 11,762,676 B2
(45) Date of Patent: Sep. 19, 2023

(54) OPTIMIZED SOFTWARE DELIVERY TO AIRGAPPED ROBOTIC PROCESS AUTOMATION (RPA) HOSTS

(71) Applicant: UiPath Inc., New York, NY (US)

(72) Inventors: Vivek Jha, Bangalore (IN); Shashank Shrivastava, Bangalore (IN); Mohit Seth, New Delhi (IN)

(73) Assignee: UiPath Inc, New York, NY (US)

( * ) Notice: Subject to any disclaimer, the term of this patent is extended or adjusted under 35 U.S.C. 154(b) by 36 days.

(21) Appl. No.: 17/447,867

(22) Filed: Sep. 16, 2021

(65) Prior Publication Data
US 2023/0034658 A1    Feb. 2, 2023

(30) Foreign Application Priority Data
Jul. 30, 2021 (IN) .............................. 202111034446

(51) Int. Cl.
*G06F 9/455* (2018.01)
*G06F 8/71* (2018.01)
(Continued)

(52) U.S. Cl.
CPC .............. *G06F 9/4552* (2013.01); *G06F 8/63* (2013.01); *G06F 8/71* (2013.01); *G06F 18/214* (2023.01); *G06N 20/00* (2019.01)

(58) Field of Classification Search
CPC . G06F 8/63; G06F 8/71; G06F 9/4552; G06F 18/214; G06K 9/6256; G06N 20/00
See application file for complete search history.

(56) References Cited

U.S. PATENT DOCUMENTS

| | | | |
|---|---|---|---|
| 9,336,115 B1 * | 5/2016 | Bienkowski | G06F 11/3419 |
| 10,409,569 B1 * | 9/2019 | Wang | G06N 3/0454 |

(Continued)

FOREIGN PATENT DOCUMENTS

| | | |
|---|---|---|
| CN | 103605505 A | 2/2014 |
| CN | 109739524 A | 5/2019 |

(Continued)

OTHER PUBLICATIONS

Korea Patent Office (KPO), International Search Report dated Apr. 19, 2022 for PCT Application No. PCT/US2021/061210, international filing date Nov. 30, 2021, priority date Jul. 30, 2021.

(Continued)

*Primary Examiner* — Douglas M Slachta
(74) *Attorney, Agent, or Firm* — Law Office of Andrei D Popovici, PC (57) ABSTRACT

Some embodiments address unique challenges of provisioning RPA software to airgapped hosts, and in particular, provisioning RPA machine learning components and training corpora of substantial size, and provisioning to multiple airgapped hosts having distinct hardware and/or software specifications. To reduce costs associated with data traffic and manipulation, some embodiments bundle together multiple RPA components and/or training corpora into an aggregate package comprising a deduplicated collection of software libraries. Individual RPA components are then automatically reconstructed from the aggregate package and distributed to airgapped hosts.

17 Claims, 8 Drawing Sheets

(51) Int. Cl.
*G06F 8/61* (2018.01)
*G06F 18/214* (2023.01)
*G06N 20/00* (2019.01)

(56) References Cited

U.S. PATENT DOCUMENTS

| | | | |
|---|---|---|---|
| 10,564,959 B2 | 2/2020 | Kennedy et al. | |
| 10,733,227 B2 | 8/2020 | Scrivano | |
| 2008/0147703 A1* | 6/2008 | Behnen | G06F 8/71 |
| | | | 707/999.102 |
| 2009/0249296 A1* | 10/2009 | Haenel | G06F 8/71 |
| | | | 717/120 |
| 2014/0089275 A1* | 3/2014 | Akirav | G06F 3/0652 |
| | | | 707/692 |
| 2014/0282457 A1 | 9/2014 | Chow et al. | |
| 2015/0363195 A1* | 12/2015 | Schlueter | G06F 8/60 |
| | | | 717/121 |
| 2017/0123775 A1* | 5/2017 | Xu | G06F 8/451 |
| 2018/0025160 A1* | 1/2018 | Hwang | G06F 9/455 |
| | | | 726/25 |
| 2018/0267796 A1* | 9/2018 | Kennedy | G06F 8/61 |
| 2018/0275987 A1 | 9/2018 | Vandeputte | |
| 2018/0300653 A1* | 10/2018 | Srinivasan | H04L 67/06 |
| 2018/0349168 A1* | 12/2018 | Ahmed | G06F 11/3006 |
| 2019/0235852 A1* | 8/2019 | Bartolotta | G06F 8/65 |
| 2019/0251190 A1 | 8/2019 | Scrivano | |
| 2019/0318240 A1* | 10/2019 | Kulkarni | H04L 67/34 |
| 2019/0354389 A1* | 11/2019 | Du | G06F 9/45545 |
| 2020/0097357 A1 | 3/2020 | Shwartz et al. | |
| 2020/0234183 A1 | 7/2020 | Ghatage et al. | |
| 2020/0304526 A1* | 9/2020 | Abraham | G06F 9/455 |
| 2020/0409921 A1 | 12/2020 | Starks et al. | |
| 2021/0107141 A1* | 4/2021 | Shrivastava | G06N 20/00 |
| 2021/0110035 A1* | 4/2021 | Seth | G06N 20/00 |

FOREIGN PATENT DOCUMENTS

| | | |
|---|---|---|
| CN | 109960514 A | 7/2019 |
| CN | 106802807 B | 7/2020 |
| EP | 2637094 A1 | 9/2013 |

OTHER PUBLICATIONS

Korea Patent Office (KPO), Written Opinion dated Apr. 19, 2022 for PCT Application No. PCT/US2021/061210, International filing date Nov. 30, 2021, priority date Jul. 30, 2021.
European Patent Office (EPO), Extended European Search Report dated May 25, 2022 for EPO Application No. 21218223.2-1203, international filing date Nov. 30, 2021, priority date Jul. 30, 2021.

* cited by examiner

OPTIMIZED SOFTWARE DELIVERY TO AIRGAPPED ROBOTIC PROCESS AUTOMATION (RPA) HOSTS

BACKGROUND

The invention relates to robotic process automation (RPA), and in particular to delivering relatively large data objects to airgapped RPA hosts.

RPA is an emerging field of information technology aimed at improving productivity by automating repetitive computing tasks, thus freeing human operators to perform more intellectually sophisticated and/or creative activities. Notable tasks targeted for automation include, among others, extracting structured data from documents, generating invoices and other business documents, and interacting with user interfaces, for instance to fill in forms.

One particular area of RPA development comprises training and deploying artificial intelligence (AI) systems configured to automate various tasks. Exemplary AI systems used in RPA include artificial neural networks trained to automatically process images, for instance to automatically extract structured data from scanned documents such as invoices and résumés. Other examples include neural networks configured for natural language processing tasks, for instance automatic translation, automatic classification of text documents, and sentiment detection, among others.

The performance of an AI system depends strongly on the specificity and quality of the training data. Stated otherwise, AI systems may need to be trained specifically for each task, preferably using data specific to the respective RPA customer. Successful training may further require a relatively high volume of training data, of the order of thousands to millions of samples, depending on the task. In view of these particular requirements, training, configuring, and deploying AI-based systems to RPA customers may require transferring large volumes of data across communication networks.

While data-heavy operations are not usually seen as a problem in the age of fast Internet, they may be impractical in the case of airgapped hosts, i.e., computer systems which operate in relative isolation for computer security and/or confidentiality reasons. Airgapping typically refers to a manner of configuring and operating a communication network, wherein at least a subset of network nodes are physically or logically disconnected from the rest of the network. Exemplary airgapped computing hosts may be found in banking, critical infrastructure operations, and the military, among others.

Delivering data-heavy RPA software such as AI-based components and training corpora to an airgapped host may therefore pose specific and substantial technical challenges. There is an interest in facilitating such operations, for the benefit of extending the reach of RPA technology.

SUMMARY

According to one aspect, a robotic process automation (RPA) method comprises employing at least one hardware processor of a computer system receive a data package and an unpacking script, the data package combining at least two distinct versions of an RPA software module implementing a machine learning model. The data package encodes a deduplicated plurality of RPA machine learning libraries, wherein a first version of the RPA software module comprises a first subset of the plurality of RPA machine learning libraries, wherein a second version of the RPA software module comprises a second subset of the plurality of RPA machine learning libraries, and wherein the first and second subsets share at least a selected library of the plurality of RPA machine learning libraries. The method further comprises in response, employing the at least one hardware processor to unpack the data package according to the unpacking script to produce at least the first version of the RPA software module, and to transfer the first version of the RPA software module to an airgapped RPA host system configured to execute the machine learning model.

According to another aspect, a computer system comprises at least one hardware processor configured to receive a data package and an unpacking script, the data package combining at least two distinct versions of an RPA software module implementing a machine learning model. The data package encodes a deduplicated plurality of RPA machine learning libraries, wherein a first version of the RPA software module comprises a first subset of the plurality of RPA machine learning libraries, wherein a second version of the RPA software module comprises a second subset of the plurality of RPA machine learning libraries, and wherein the first and second subsets share at least a selected library of the plurality of RPA machine learning libraries. The at least one hardware processor is further configured, in response, to unpack the data package according to the unpacking script to produce at least the first version of the RPA software module, and to transfer the first version of the RPA software module to an airgapped RPA host system configured to execute the machine learning model.

According to another aspect, a non-transitory computer-readable medium stores instructions which, when executed by at least one hardware processor of a computer system, cause the computer system to receive a data package and an unpacking script, the data package combining at least two distinct versions of an RPA software module implementing a machine learning model. The data package encodes a deduplicated plurality of RPA machine learning libraries, wherein a first version of the RPA software module comprises a first subset of the plurality of RPA machine learning libraries, wherein a second version of the RPA software module comprises a second subset of the plurality of RPA machine learning libraries, and wherein the first and second subsets share at least a selected library of the plurality of RPA machine learning libraries. The instructions further cause the computer system, in response, to unpack the data package according to the unpacking script to produce at least the first version of the RPA software module, and to transfer the first version of the RPA software module to an airgapped RPA host system configured to execute the machine learning model.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
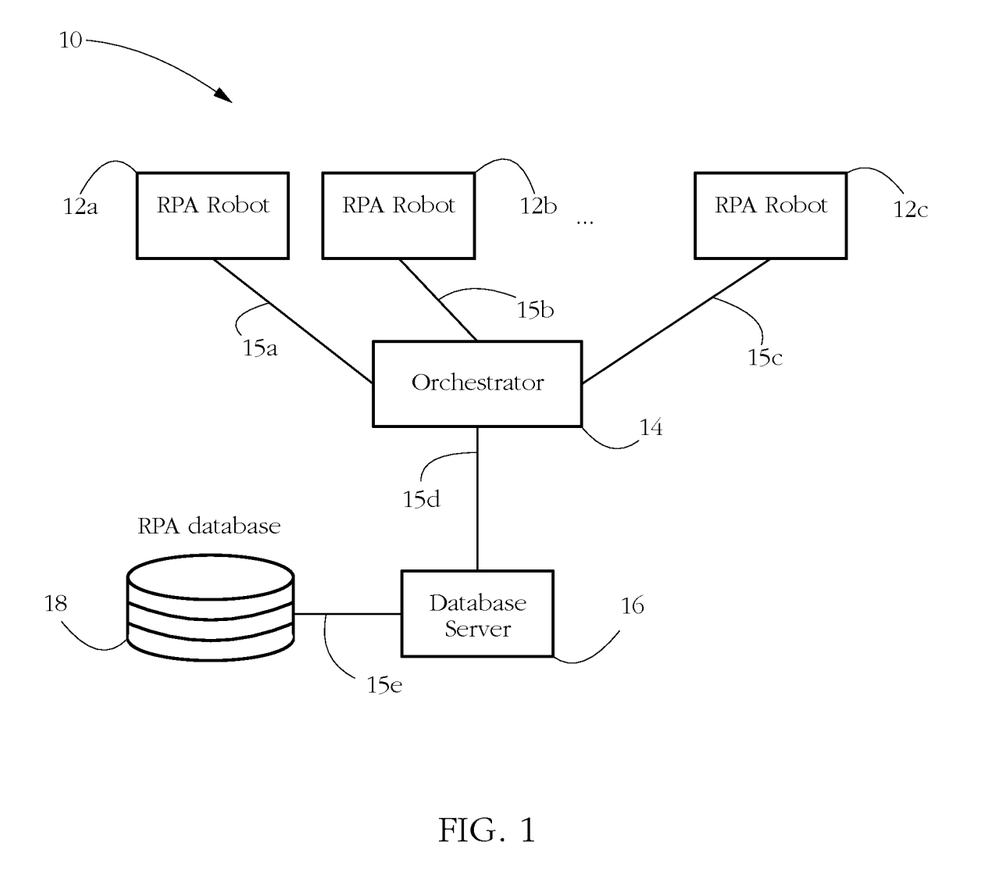
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a process. Exemplary operations forming a part of an invoice-issuing process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button. Various elements of RPA environment 10 may automate the respective process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 34 (FIG. 2) enables a human developer to design a software robot to implement a workflow that effectively automates a target process. A workflow typically comprises a sequence of custom automation steps, herein deemed activities. Each activity may include an action performed by the robot, such as clicking a button, reading a file, writing to a spreadsheet cell, etc. Activities may be nested and/or embedded. In some embodiments, RPA design application 34 exposes a user interface and set of tools that give the developer control of the execution order and the relationship between activities of a workflow. One commercial example of an embodiment of RPA design application 34 is UiPath StudioX™.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Some workflow activities may be configured to be carried out by artificial intelligence agents, for instance neural networks pre-trained to perform the respective tasks. In one example, a workflow includes a sequence of steps for automatic processing of invoices. However, when the respective invoices are available as images (scans or photographs of actual paper documents), some activities of the respective workflow may comprise automatically extracting structured data such as an invoice number, a VAT amount, a total amount paid, and a client name from an invoice image. An RPA robot configured to carry out such activities may comprise a trained machine learning model such as a set of neural networks trained on a corpus of invoice samples. Such machine learning models are described in further detail below.

Figure 2:
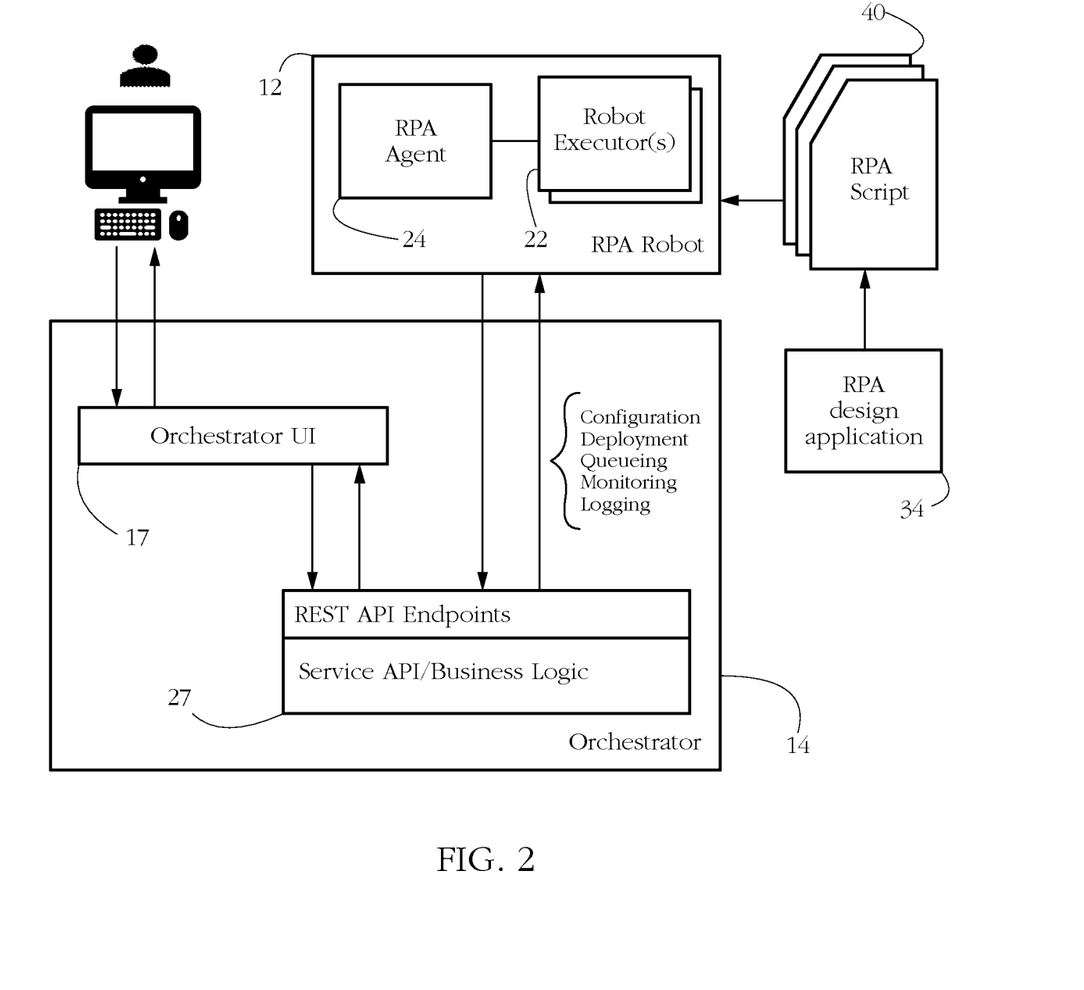
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), Javascript Object Notation (JSON), or a programming language such as C#, Visual Basic, Java, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code).

A skilled artisan will appreciate that RPA design application 30 may comprise multiple components/modules, which may execute on distinct physical machines. In one such example illustrating a cloud computing embodiment of the present invention, RPA design application 30 may execute in a client-server configuration, wherein one component of application 30 may expose a robot design interface to a user of a client computer, and another component of application 30 executing on a server computer may assemble the robot workflow and formulate/output RPA script 40. For instance, a developer may access the robot design interface via a web browser executing on the client computer, while the software processing the user input received at the client computer actually executes on the server computer.

Once formulated, scripts 40 may be executed by a set of robots 12a-c (FIG. 1), which may be further controlled and coordinated by an orchestrator 14. Robots 12a-c and orchestrator 14 may each comprise a plurality of computer programs, which may or may not execute on the same physical machine. Exemplary commercial embodiments of robots 12a-c and orchestrator 14 include UiPath Robots™ and UiPath Orchestrator™, respectively. Types of robots 12a-c include, but are not limited to, attended robots, unattended robots, development robots (similar to unattended robots, but used for development and testing purposes), and non-production robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12a-c. Provisioning may include creating and maintaining connections between robots 12a-c and orchestrator 14. Deployment may include ensuring the correct delivery of software (e.g, RPA scripts 40) to robots 12a-c for execution. Configuration may include maintenance and delivery of robot environments and workflow configurations. Queueing may include providing management of job queues and queue items. Monitoring may include keeping track of robot state and maintaining user permissions. Logging may include storing and indexing logs to a database and/or another storage mechanism (e.g., SQL, ElasticSearch™, Redis™) Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a Windows™ Workflow Foundation Application Programming Interface from Microsoft, Inc. Robot 12 may comprise a set of executors 22 and an RPA agent 24. Robot executors 22 are configured to receive RPA script 40 indicating a sequence of activities that mimic the actions of a human operator carrying out a business process, and to actually perform the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a Windows™ environment, robot 12 installs a Microsoft Windows™ Service Control Manager (SCM)-managed service by default. As a result, such robots can open interactive Windows™ sessions under the local system account and have the processor privilege of a Windows™ service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows™ Server 2012), multiple robots may be running at the same time, each in a separate Windows™ session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several jobs/workflows concurrently. RPA agent 24 (e.g., a Windows™ service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14, for instance as a heartbeat signal. In turn, orchestrator 14 may use the channel to transmit acknowledgements, job requests, and other data such as RPA scripts 40 to robot 12.

Orchestrator 14 may execute on a server side, possibly distributed over multiple physical and/or virtual machines. In one such embodiment, orchestrator 14 may include an orchestrator user interface (UI) 17 which may be a web application, and a set of service modules 19. Service modules 19 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups/pools, assigning workflows to robots, adding/removing data to/from queues, scheduling to jobs to run unattended, analyzing logs per robot or workflow, etc. Orchestrator UI 17 may use Hypertext Markup Language (HTML), JavaScript (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12*a-c*, robot pools, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ElasticSearch™, and Redis™, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15*a-e* interconnecting various members of environment 10. Such links may be implemented according to any method known in the art, for instance as virtual network links, virtual private networks (VPN), or end-to-end tunnels. Some embodiments further encrypt data circulating over some or all of links 15*a-e*.

Figure 3:
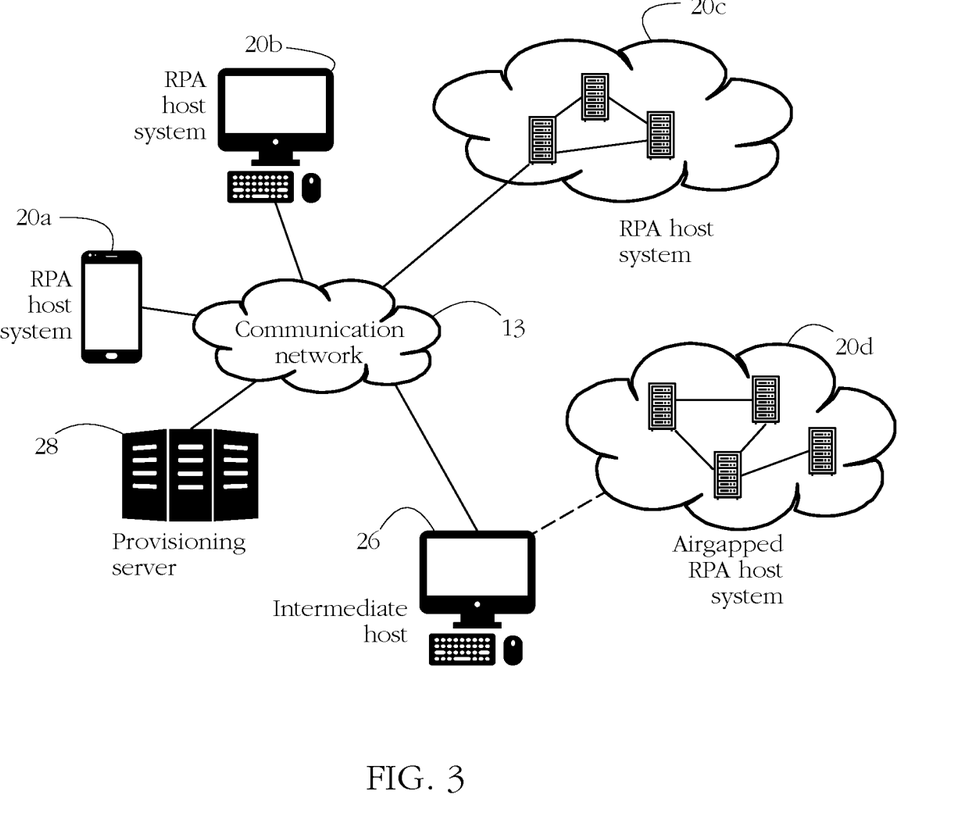
FIG. 3 shows a variety of RPA host systems including airgapped hosts according to some embodiments of the present invention.

A skilled artisan will understand that various components of RPA environment 10 may be implemented and/or may execute on distinct host computer systems (physical appliances and/or virtual machines.) FIG. 3 shows a variety of such RPA host systems 20*a-d* according to some embodiments of the present invention. Each host system 20*a-d* represents a computing system (an individual computing appliance or a set of interconnected computers) having at least a hardware processor and a memory unit for storing processor instructions and/or data. Exemplary RPA hosts 20*a-d* include personal computers, laptop and tablet computers, mobile telecommunication devices (e.g., smartphones), and corporate mainframe computers, among others. Another exemplary RPA host illustrated as item 12*c* comprises a cloud computing platform such as a server farm operated by Amazon™ AWS or Microsoft™ Azure™, among others. RPA hosts 12*a-c* may communicate with a provisioning server 28 over a communication network 13 such as the Internet, to receive RPA software such as various components of RPA robot 12, orchestrator 14, RPA design application 34, as well as artificial intelligence components such as machine learning models and training corpora, among others.

Some RPA hosts may be airgapped, as illustrated by exemplary host 20*d* in FIG. 3. For the purpose of the present disclosure, an airgapped host comprises a set of computing devices which cannot connect to server 28 via communication network links. Stated otherwise, there is a physical or logical block to a network connection between an airgapped host and provisioning server 28. A simple example of an airgapped host is a computer that is not connected, either by cable or wirelessly, to other computers or communication network 13. Another example of an airgapped host comprises a set of interconnected computer systems (e.g., members of a local area network), but wherein the respective set of computers is not further connected to an extended network such as the Internet. Yet another example of an airgapped host comprises a computer located behind a strict firewall that prevents communications between the respective host and an extended networks including provisioning server 28.

Various methods may be used to transfer RPA software and data to/from an airgapped RPA host. In one example according to some embodiments of the present invention, the respective data may be received from provisioning server 28 at an intermediate host 26 comprising a computing appliance connected to communication network(s) 13. An operator may then employ intermediate host 26 to transfer data destined for airgapped host 20*d* to a non-transitory computer readable medium such as an external hard drive or to a file repository on a local network physically or logically separated from network 13. The operation of an exemplary intermediate host 26 will be further detailed below.

Figure 4:
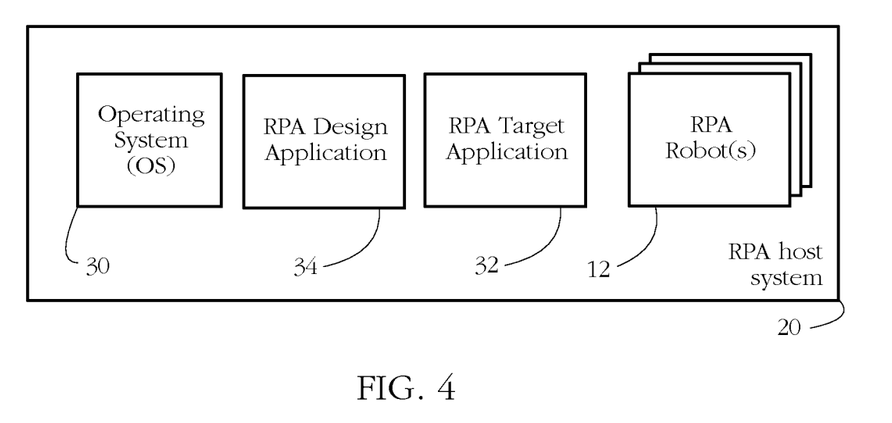
FIG. 4 shows exemplary RPA components executing on an RPA host according to some embodiments of the present invention.

FIG. 4 shows exemplary software components executing on an RPA host system 20 according to some embodiments of the present invention. Host system 20 generically represents any of RPA host systems illustrated in FIG. 3, including airgapped host 20*d*. An operating system (OS) 30 may comprise any widely available operating system such as Microsoft Windows™ MacOS™, Linux™, iOS™, or Android™, among others, comprising a software layer that interfaces between the hardware of host system 20 and other software executing on the respective computing device. RPA host 20 may further execute an instance of an RPA target application 32 comprising a software application targeted for automation by robot 12, for instance an instance of Microsoft Excel™ or a web browser. RPA target application 32 generically represents any computer program used by a human operator to carry out a task. Exemplary applications 32 include, among others, a word processor, a spreadsheet application, a graphics application, a browser, a social media application, and an electronic communication application.

In one use-case scenario wherein host 20 is used for developing RPA applications (an aspect of RPA known in the art as design side or design time), host 20 may execute an instance of RPA design application 34, comprising a set of computer programs (e.g., an integrated development environment—IDE) for designing a robot configured to carry out a particular task. Application 34 may expose a user interface with various tools for constructing and organizing a workflow, defining individual RPA activities, and setting various activity parameters. In some embodiments, RPA design application 34 includes tools/software modules for designing, training, and/or deploying machine learning (ML) models capable of executing specific RPA activities, such as automatic processing of text and images, among others. In another use-case scenario wherein host system 20 is used in production (also known in the art as runtime), host 20 may execute a set of RPA robots 12, some of which may implement various ML models. In some embodiments, machine learning models as well as the associated training corpora may be delivered to RPA host system 20 in the form of machine learning packages, as described below.

Figure 5:
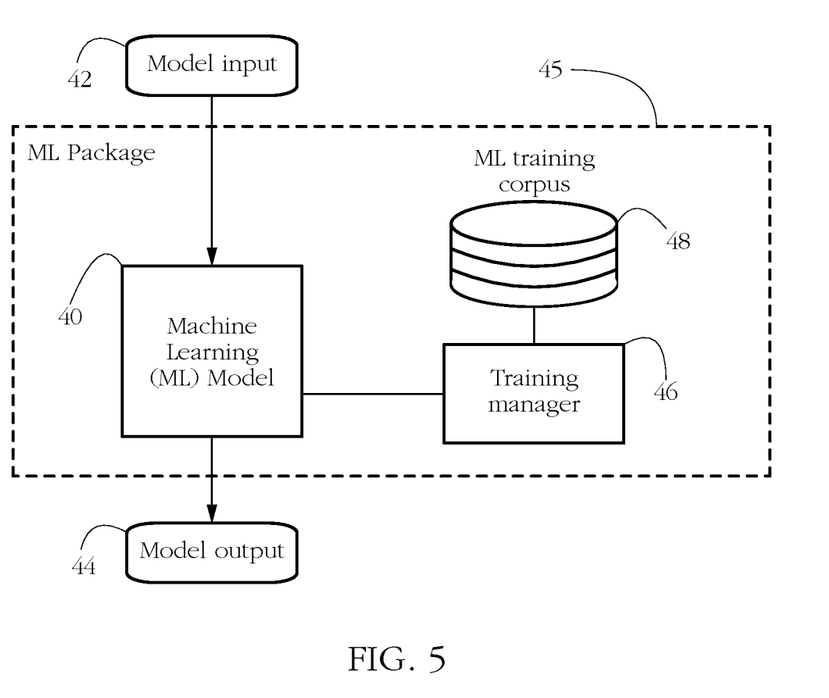
FIG. 5 illustrates exemplary components of a machine learning (ML) package according to some embodiments of the present invention.

FIG. 5 schematically illustrates machine learning (ML) models and ML packages according to some embodiments of the present invention. A ML model 40 comprises any implementation (e.g., software, hardware, or a combination thereof) of an artificial intelligence system whose performance, quantified for instance as a utility function, can be automatically optimized via a process of training. Examples of ML models include, among others, an artificial neural network, a decision tree, a support vector machine, a Bayesian network, and a clustering classifier. ML model 40 is configured to receive a model input 42 and apply a model-specific algorithm to produce a model output 44 according to input 42. In an automatic image processing example, input 42 may comprise an image of an invoice, and output 44 may comprise a number representing the VAT amount paid on the respective invoice. In an automatic natural language processing example, input 42 may comprise a content of a social media post, and output 44 may comprise an indicator of whether a tone of the respective social media post is positive or negative.

In some embodiments, training ML model 40 comprises presenting model 40 with a variety of training inputs. For each training input, training may comprise processing the respective input according to the respective model to produce a training output, determining a value of a model-specific utility function according to the respective training output, and adjusting a set of parameters of model 40 according to the respective utility value. Adjusting the parameters may aim for maximizing (or in some cases, minimizing) the utility function. In one example where ML model 40 comprises a neural network, adjustable parameters may include a set of synapse weights, while the utility function may quantify a departure of the training output from an expected or desired output. In such an example, training may comprise adjusting synapse weights and possibly other network parameters so as to bring the training output closer to the desired output corresponding to the respective training input.

In some embodiments, a training corpus 48 comprises a collection of training inputs for the respective ML model. In an image processing example, corpus 48 may comprise a library of images encoded in a computer-readable form. For instance, corpus 48 may comprise a collection of images of invoices and/or cashier receipts. In a language-processing example, corpus 48 may comprise a set of text samples, e.g., a collection of comments posted on a social media site, a collection of news articles, etc. Individual corpus items may be tagged, labelled and/or annotated, for instance using metadata. Exemplary metadata may include an indicator of membership to a selected class/category of items (e.g., images containing human faces, employees of a particular department, invoices from a selected customer, etc.) and various data extracted from the respective corpus item (e.g., a total amount on a respective invoice), among others. Corpus 48 may be organized and stored in any format known in the art, for instance as a relational database, a simple list, or as structured data specified in an XML or JSON format.

In some embodiments, a training manager 46 comprises computer programs for training ML model 40 using training corpus 48. As such, manager 46 may select training inputs from corpus 48, execute ML model 40 to produce the respective training outputs, tune the adjustable parameters of model 40, and/or evaluate the performance of ML model 40. Training manager 46 may implement any ML training algorithm known in the art, including, for instance, supervised learning, reinforcement learning, unsupervised learning, self-supervised learning, and a genetic algorithm, among others. Manager 46 may conduct training until some termination condition is satisfied, for instance for a pre-determined number of training inputs or epochs, or until ML model 40 attains a pre-determined level of performance.

ML model 40 may be delivered to RPA host system(s) 20*a-d* in the form of a ML package 45 which may further include an instance of training corpus 48 and/or an instance of training manager 46, among others. A single ML package may include a plurality of training corpora and/or a plurality of ML models. Components 40, 46, and/or 48 may be encoded as individual software libraries, as further described below. ML package 45 may therefore consist of a bundle of libraries, which may be further archived and/or compressed together in one file, such as a tarball or ZIP archive.

In another exemplary embodiment, ML package 45 comprises a virtual machine image having an operating system and all software necessary for executing a ML model. Yet another exemplary ML package 45 may comprise a container image, such as a Java®, Docker®, rkt, or Mesos® container. The term 'container' herein denotes a distinct and isolated virtual environment having a virtualized operating system and code for executing a ML model (including all dependencies). Stated otherwise, containers are a form of OS-level virtualization, i.e., they differ from full-fledged virtual machines in that they do not include a true OS, but virtualize some features of the actual OS executing on the respective hardware platform. A computer program executing within a container is only aware of the contents of the respective container and of hardware devices assigned to the respective container. In contrast, programs executing on a conventional OS typically have access to all resources of the respective hardware platform.

Some container development environments, such as Docker® among others, organize container contents as a stack of layers, wherein each layer represents a set of software objects/libraries that call on the functionality of the layer(s) underneath. An exemplary ML package 45 formatted as a Docker® container image may have a top layer comprising the binaries of the respective ML model, some intermediate layers comprising various model dependencies, and a bottom layer comprising OS virtualization code.

Some embodiments of the present invention rely on the observation that since airgapped hosts are normally not connected to provisioning server 28, software provisioning to such hosts does not benefit from some of the facilities of modern software distribution. For instance, a conventional, automatic, incremental software update mechanism may be impossible or impractical to implement on airgapped hosts. Instead, data transfers to/from airgapped hosts may be carried out by human operators of substantial skill and responsibility, considering the strict security and/or confidentiality that justify airgapping. Furthermore, airgapped hosts may comprise multiple computers, possibly having distinct hardware configurations and operating systems. Machine learning packages may prove additionally difficult to provision, due to their relatively large size (for instance, ML training corpora may be in the range of several hundreds of Megabytes to several Gigabytes).

Figure 6:
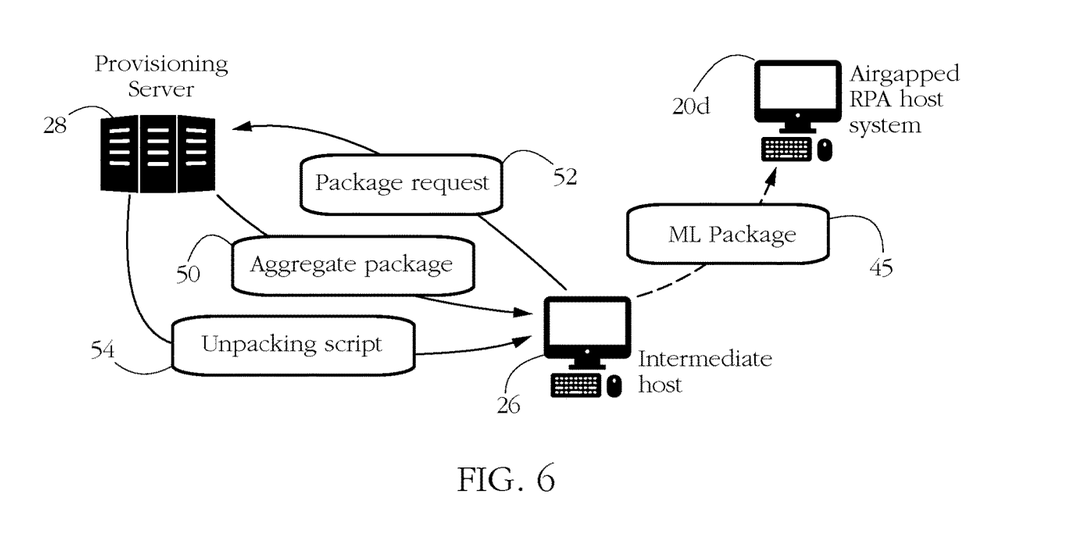
FIG. 6 illustrates an exemplary exchange between an airgapped RPA host system and a provisioning server according to some embodiments of the present invention.

In view of the above, some embodiments facilitate provisioning of ML-based RPA software by bundling multiple ML packages into an aggregate package for delivery to airgapped hosts. The aggregate package is further optimized for delivery by de-duplicating its contents, as described below. In one example illustrated in FIG. 6, provisioning server 28 may establish a connection with an intermediate host 26 over communication network 13. Intermediate host 26 may comprise a computer system owned and/or operated by the same entity that owns and/or operates airgapped RPA host 20d. To initiate software provisioning, some embodiments of intermediate host 26 transmit a package request 52 to provisioning server 28, request 52 indicating a set of desired ML resources and/or a set of hardware and/or software specifications of airgapped host 26d which will host/execute the respective ML resources. In response to receiving request 52, provisioning server 28 may assemble an aggregate package 50 according to the contents of request 52 and transmit aggregate package 50 to intermediate host 26.

Figure 7:
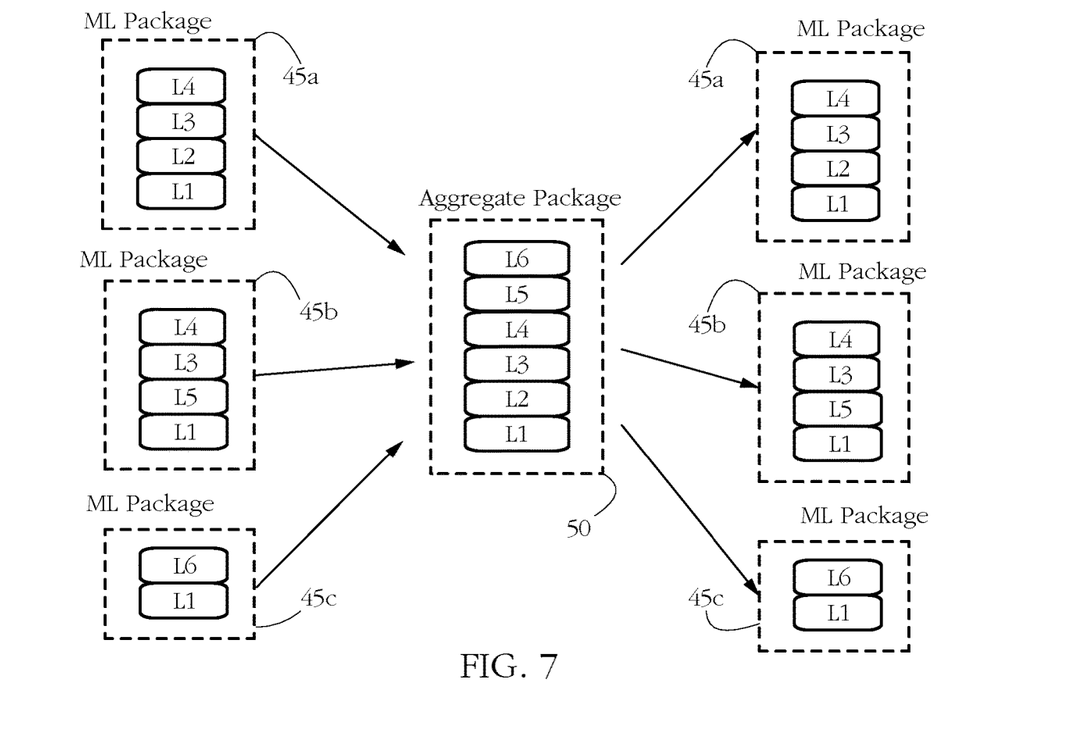
FIG. 7 shows packing a plurality of exemplary ML packages into an aggregate ML package, and unpacking individual ML packages from the respective aggregate package according to some embodiments of the present invention.

FIG. 7 illustrates an exemplary aggregate package 50 bundling a plurality of individual ML packages 45a-c. Each ML package 45a-c comprises a set of individual RPA libraries, denoted L1 through L6 in FIG. 7. Libraries L1-L6 generically represent data files/structures/software objects of any type or format, comprising code and/or data used for implementing RPA activities. Exemplary RPA libraries according to some embodiments of the present invention comprise a source code file formulated in any programming language, an executable file (e.g., a portable executable), a script file, a shared library (e.g., a dynamic linked library—DLL), a collection of images encoded in computer-readable form, and a database, among others. Another exemplary library consists of metadata, for instance descriptive metadata about the respective ML package, structural metadata specifying a manner in which libraries of the respective ML package fit or work together, etc. A single library may comprise multiple objects, for instance all contents of a selected folder. The order in which individual libraries are depicted may be arbitrary and may not reflect an actual hierarchy of software objects.

In one example, library L1 may represent code and/or software dependencies of ML model 40, library L2 represents code and/or dependencies of training manager 46, while libraries L3 and L4 may comprise two distinct training corpora (see e.g., FIG. 5). In another example, library L4 denotes source code of ML model 40, libraries L2 and L3 denote various software dependencies of L4 (e.g., DLLs), and L1 denotes a collection of selected OS functions. In yet another example wherein ML package 45a comprises a container image, libraries L1-L4 may denote distinct Docker® layers of the respective container image. In some embodiments, aggregate package 50 comprises a deduplicated plurality of RPA libraries, as further detailed below.

In some embodiments, provisioning server 28 further transmits an unpacking script 54 to intermediate host 26, script 54 comprising a specification for unpacking aggregate package 50. Unpacking herein denotes reconstructing individual ML packages 45 from aggregate package 50, as visually illustrated by the right-hand side of FIG. 7. The term 'script' herein generically denotes any data allowing an unambiguous recovery of individual ML packages that were packed into aggregate package 50. One exemplary script 54 comprises a set of instructions (e.g., command lines, portable executable) which, when executed by a processor of a computer system, cause the respective computer system to re-create individual ML packages from aggregate package 50. Another example of script 54 comprises a specification of a content of each individual ML package, for instance a listing of software libraries that make up each individual ML package, a set of path indicators locating individual libraries or other dependencies, an order in which various libraries must be added to an executable build or to a container image, etc. Such a script may be encoded in any format known in the art, for instance as a text file, XML file, JSON file, etc.

Figure 8:
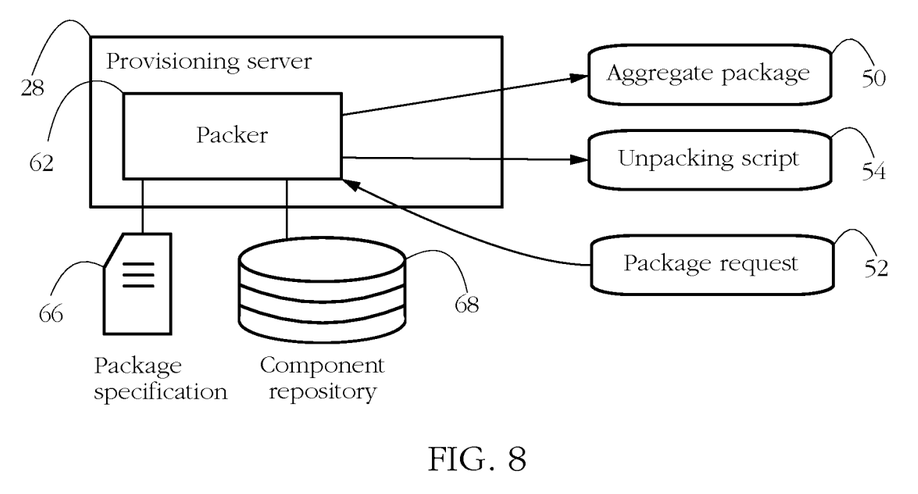
FIG. 8 illustrates a packer component executing on the provisioning server according to some embodiments of the present invention.
Figure 9:
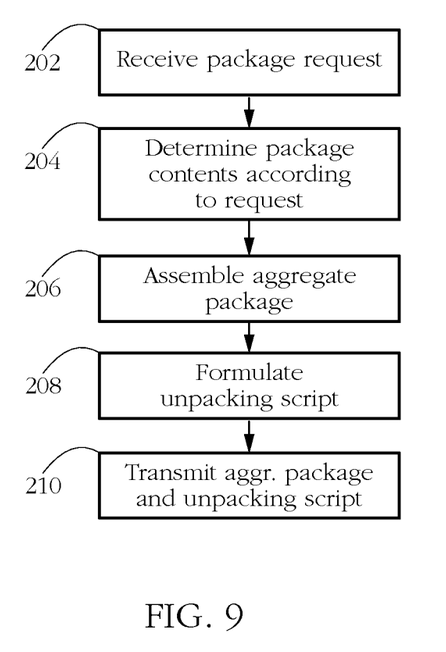
FIG. 9 shows an exemplary sequence of steps carried out by the provisioning server according to some embodiments of the present invention.

FIG. 8 shows an exemplary packer module 62 executing on a provisioning server according to some embodiments of the present invention. In turn, FIG. 9 shows an exemplary sequence of steps performed by packer 62. In response to receiving package request 52, packer 62 may identify a set of ML packages according to request 52 (see e.g., exemplary ML packages 45a-c in FIG. 7). In a step 204, some embodiments may determine a content/structure of each requested ML package, possibly according to a package specification 66, and locate and/or retrieve the respective RPA libraries in/from a component repository 68. Repository 68 may comprise computer-readable media forming part of, or communicatively coupled to, provisioning server 28. For instance, RPA libraries such as ML source code, dependencies, and training corpora may reside on a local hard drive, on a network drive accessible via a local area network, or on a remote server computer accessible via a web interface.

In a step 206, packer 62 may pack the identified ML packages into aggregated package 50. Packing herein denotes the set of procedures carried out to construct aggregated package 50 according to individual ML packages, as intuitively illustrated by the left-hand side of FIG. 7. Packing may comprise enumerating all RPA libraries that make up individual ML packages 45a-c, constructing a deduplicated plurality of RPA libraries from the enumerated list, and copying an instance of each library of the deduplicated plurality of RPA libraries into aggregate package 50. In some embodiments, the deduplicated plurality of RPA libraries comprises all RPA libraries that appear in the individual ML packages, with each distinct library appearing only once. Stated otherwise, when two ML packages have a selected library in common, a deduplicated plurality of libraries constructed from the respective ML packages contains all libraries of the respective ML packages but only one copy of the selected library. In the example illustrated in FIG. 7, aggregate package 50 comprises a single copy of libraries L1-L6 although some of said libraries appear in multiple individual ML packages 45a-c.

Step 206 may further comprise compressing/archiving the deduplicated plurality of RPA libraries using any data compression method known in the art, for instance creating a tarball or Zip file combining the respective libraries. A skilled artisan will understand that the resulting aggregate package 50 may consist of a single file or may be broken up into several distinct files/volumes to facilitate storage and/or transfer. In an alternative embodiment that uses a containerized model of computing, step 206 may comprise creating a container image to hold all of the deduplicated plurality of RPA libraries. Individual libraries may be added to the respective container image in a particular order that may reflect an object hierarchy, dependency structure, layering, etc.

In some embodiments, a step 208 formulates unpacking script 54 comprising a specification for reconstructing individual ML packages from aggregate package 50. An exemplary script 54 comprises a set of commands (e.g., command lines or a portable executable file) for de-compressing aggregate package 50, copying various RPA libraries to specific storage locations, and writing a set of metadata such as a path indicator indicating the respective storage locations, among others. In some embodiments, script 54 comprises commands for building and/or compiling a content of reconstructed ML packages to produce a set of executable objects. In another exemplary embodiment, script 54 may comprise a set of commands for building individual container images corresponding to each individual ML package 45a-c (using the example illustrated in FIG. 7). The commands may explicitly indicate which libraries to include in each individual container image. In a further step 210, provisioning server 28 may transmit aggregate package 50 and unpacking script 54 to intermediate host 26 over communication network 13.

Figure 10:
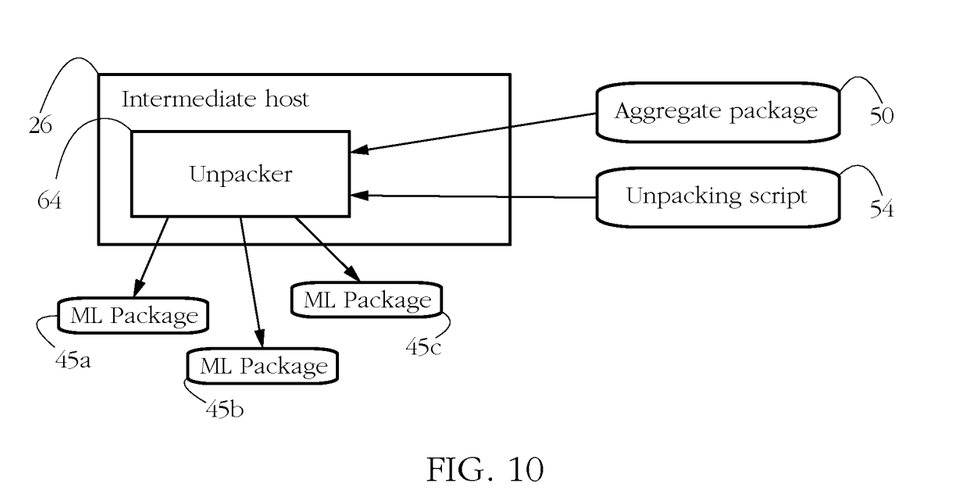
FIG. 10 shows an exemplary unpacker component executing on an intermediate host according to some embodiments of the present invention.
Figure 11:
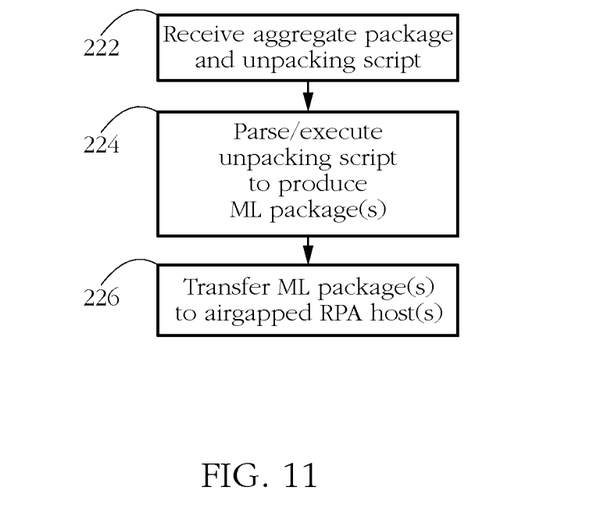
FIG. 11 shows an exemplary sequence of steps executed by the intermediate host according to some embodiments of the present invention.

FIG. 10 illustrates an exemplary unpacker component 64 executing on intermediate host according to some embodiments of the present invention. In turn, FIG. 11 shows an exemplary sequence of steps performed by unpacker 64. Unpacker 64 is configured to receive aggregate package 50 and unpacking script 54 from provisioning server 28. In response, a step 224 may unpack aggregated package 50. Unpacking comprises automatically reconstructing individual ML packages that make up aggregate package 50, as represented by the right-hand side of FIG. 7. In some embodiments, step 224 comprises executing script 54 on a local processor of intermediate host 26, which may cause host 26 to automatically create individual ML packages 45a-c. In an alternative embodiment wherein unpacking script 54 is not executable but instead comprises a specification of ML packages 45a-c (e.g., a list of libraries making up each ML package) step 224 may comprise parsing script 54 and constructing each ML package according to the respective package specification. When ML packages 45a-c comprise container images (e.g., Docker® images), step 224 comprises building the respective images.

In a further step 226, intermediate host 26 may transfer individual ML packages 45a-c to their destination RPA hosts, including airgapped RPA host system 20d (FIG. 3). Transferring may comprise writing at least one ML package to a removable computer-readable medium (e.g. an external hard drive, memory stick, etc.) for transport to airgapped host 20d. In another exemplary embodiment, step 226 comprises writing at least one ML package to a file repository on a local network physically or logically separated from network 13, where it can be retrieved by airgapped RPA host 20d. In some embodiments wherein intermediate host 26 manages software distribution to multiple airgapped RPA hosts, step 226 may comprise transferring each ML package 45a-c to its intended recipient.

In an alternative embodiment, in response to receiving aggregate package 50 and script 54, intermediate host 26 may directly transfer them to airgapped RPA host system 20d, which may further unpack aggregate package 50 according to script 54 to produce the plurality of ML packages 45a-c. In such embodiments, unpacker 64 (steps 222-224) may execute on airgapped host 20d instead of intermediate host 26 as illustrated in FIGS. 10-11.

Figure 12:
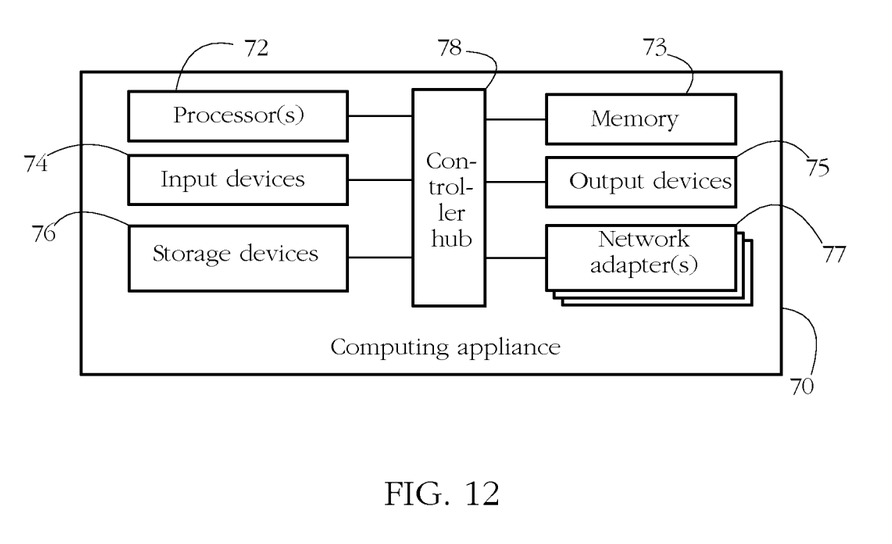
FIG. 12 shows an exemplary hardware configuration of a computing appliance programmed to execute some of the methods described herein.

FIG. 12 shows an exemplary hardware configuration of a computing appliance 70 programmed to execute some of the methods described herein. Computing appliance 70 may represent any of RPA host systems 20a-d, intermediate host 26, and provisioning server 28 in FIG. 3. The illustrated appliance is a personal computer; other devices such as servers, mobile telephones, tablet computers, and wearables may have slightly different configurations. Processor(s) 72 comprise a physical device (e.g. microprocessor, multi-core integrated circuit formed on a semiconductor substrate) configured to execute computational and/or logical operations with a set of signals and/or data. Such signals or data may be encoded and delivered to processor(s) 72 in the form of processor instructions, e.g., machine code.

Processors 72 are generally characterized by an instruction set architecture (ISA), which specifies the respective set of processor instructions (e.g., the x86 family vs. ARM® family), and the size of registers (e.g., 32 bit vs. 64 bit processors), among others. The architecture of processors 72 may further vary according to their intended primary use. While central processing units (CPU) are general-purpose processors, graphics processing units (GPU) may be optimized for image/video processing and some forms of parallel computing. Processors 72 may further include application-specific integrated circuits (ASIC), such as Tensor Processing Units (TPU) from Google®, Inc., and Neural Processing Units (NPU) from various manufacturers. TPUs and NPUs may be particularly suited for ML applications as described herein.

Memory unit 73 may comprise volatile computer-readable media (e.g. dynamic random-access memory—DRAM) storing data/signals/instruction encodings accessed or generated by processor(s) 72 in the course of carrying out operations. Input devices 74 may include computer keyboards, mice, and microphones, among others, including the respective hardware interfaces and/or adapters allowing a user to introduce data and/or instructions into appliance 70. Output devices 75 may include display devices such as monitors and speakers among others, as well as hardware interfaces/adapters such as graphic cards, enabling the respective computing appliance to communicate data to a user. In some embodiments, input and output devices 74-75 share a common piece of hardware (e.g., a touch screen). Storage devices 76 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 77 enable computing appliance 70 to connect to an electronic communication network (e.g, network 13 in FIG. 3) and/or to other devices/computer systems.

Controller hub 78 generically represents the plurality of system, peripheral, and/or chipset buses, and/or all other circuitry enabling the communication between processor(s) 72 and the rest of the hardware components of appliance 70. For instance, controller hub 78 may comprise a memory controller, an input/output (I/O) controller, and an interrupt controller. Depending on hardware manufacturer, some such controllers may be incorporated into a single integrated circuit, and/or may be integrated with processor(s) 72. In another example, controller hub 78 may comprise a northbridge connecting processor 72 to memory 73, and/or a southbridge connecting processor 72 to devices 74, 75, 76, and 77.

The exemplary systems and methods described above facilitate software provisioning to airgapped RPA hosts, and may thus facilitate access to RPA technology to clients operating in critical fields such as banking, healthcare, defense, law enforcement, and generally any domain where data security and confidentiality requirements are so strict as to justify airgapping.

By being disconnected from an extended communication network such as the Internet, an airgapped computer may lack the facilities that enable modern software provisioning such as automatic incremental software updates. Instead, data transfers to/from airgapped machines may require the assistance of human operators to physically bridge the respective airgaps, for instance by transporting data on removable media (e.g., external drives). Such manipulation typically increases the operating costs while introducing data security and confidentiality risks. Furthermore, airgapped hosts often comprise multiple computers, possibly having distinct hardware configurations and operating systems. Provisioning software to such clients may therefore require fetching multiple versions of the same software, for instance a Microsoft® Windows® version for installation on a few workstations and a MacOS® version for installation on a laptop computer.

Modern RPA increasingly relies on machine learning technology such as automatic image processing (computer vision) and natural language processing tools. However, provisioning machine learning RPA software to an airgapped host has its own set of technical challenges. First, machine learning models are typically paired with training corpora, which may be in the range of several hundreds of Megabytes to several Gigabytes in size. The performance of ML models strongly depends on the quality and quantity of training data, so an RPA client wishing to apply ML to a particular business process may need to train at least some ML models in house, using data specific and relevant to the respective business process. Hence the need for transferring large data files to and/or from airgapped host. Second, an important trend in modern machine learning comprises improving model performance and/or accelerating training by running such processes on particular types of processor hardware, such as graphical processing units (GPU) or even dedicated 'AI accelerator' application-specific integrated circuits (ASICs) such as tensor processing units (TPU) or neural processing units (NPU). Each such hardware processor may have its own architecture and instruction set, requiring an architecture-specific software build. RPA developers may need to test various machine learning strategies and optimizations and therefore, provisioning RPA ML software to an airgapped host may require transferring multiple versions of the same RPA ML software, each version configured to execute on a distinct type of processor. Due to the data redundancy inherent in transferring multiple versions of the same software (distinct versions may still have substantial resource overlap and/or use the same training corpora), such provisioning may be extra costly in terms of data traffic and storage.

Some embodiments directly address such technical and administrative challenges. Bundling multiple RPA components/packages together may simplify provisioning procedures and reduce the costs and risks associated with data manipulation by human operators. Some embodiments further deduplicate RPA ML resources in the process of constructing aggregate packages, which may substantially reduce the size of the provisioned packages. In one such example using the illustration in FIG. 7, ML packages 45*a* and 45*b* may implement the same ML model on two distinct processor architectures. For instance, package 45*a* may be configured to execute on a CPU, while package 45*b* may be configured to execute on a GPU. In another example, package 45*a* is configured to execute under Microsoft® Windows®, while package 45*b* is configured to execute under Linux®. The two packages may have several resources in common (e.g., libraries L1, L3, and L4) which may comprise various software dependencies and training corpora, among others. When constructing aggregate package 50, some embodiments ensure that only one copy of each distinct library is provisioned, which may provide a substantial reduction in the size of the provisioned package.

In one explicit example, a containerized ML package is configured to execute a ML model on an array of GPUs. The respective ML package may comprise a Docker® image having a Linux® virtualization layer, a layer of GPU drivers, a web framework layer (e.g., a Flask® implementation), and a layer comprising binaries of the ML model itself. Conversely, another ML package configured to execute the same ML model on a CPU may not need the GPU driver libraries. However, all other libraries/Docker® layers are common to both ML packages. Some embodiments take advantage of this redundancy by transmitting a single package comprising a deduplicated bundle of libraries, and using an appropriately formulated unpacking script to reconstructs both ML packages from the respective deduplicated bundle.

It will be clear to one skilled in the art that the above embodiments may be altered in many ways without departing from the scope of the invention. Accordingly, the scope of the invention should be determined by the following claims and their legal equivalents.

What is claimed is:

1. A robotic process automation (RPA) method comprising employing at least one hardware processor of a computer system to:
   receive a data package and an unpacking script, the data package combining at least two distinct versions of an RPA software module implementing a machine learning model, wherein the data package includes a deduplicated plurality of RPA machine learning libraries, wherein a first version of the RPA software module comprises a first subset of the plurality of RPA machine learning libraries, wherein a second version of the RPA software module comprises a second subset of the plurality of RPA machine learning libraries, wherein the first and second subsets share at least a selected library of the plurality of RPA machine learning libraries, wherein the data package comprises a container image, and wherein each of the plurality of RPA libraries comprises a distinct layer of the container image;

in response, unpack the data package according to the unpacking script to produce at least the first version of the RPA software module; and transfer the first version of the RPA software module to an airgapped RPA host system configured to execute the machine learning model.

2. The method of claim 1, wherein:

unpacking the data package further produces the second version of the RPA software module; and wherein the method further comprises employing at least one hardware processor of the computer system to transfer the second version of the RPA software module to the airgapped RPA host system.

3. The method of claim 1, wherein the first version of the RPA software module is configured to execute on processors characterized by a first instruction set architecture (ISA) and wherein the second version of the RPA software module is configured to execute on processors characterized by a second ISA distinct from the first ISA.

4. The method of claim 1, wherein the first version of the RPA software module is configured to execute on a central processing unit (CPU) and wherein the second version of the RPA software module is configured to execute on a graphics processing unit (GPU).

5. The method of claim 1, wherein the first version of the RPA software module is configured to execute on a central processing unit (CPU) and wherein the second version of the RPA software module is configured to execute on an application-specific integrated circuit (ASIC).

6. The method of claim 1, wherein the first version of the RPA software module is configured to execute on RPA hosts having a first operating system (OS), and wherein the second version of the RPA software module is configured to execute on RPA hosts having a second OS distinct from the first OS.

7. The method of claim 1, wherein the first version of the RPA software module comprises a first training corpus for training the machine learning model, and wherein the second version of the RPA software module comprises a second training corpus for training the machine learning model, the first training corpus distinct from the second training corpus.

8. The method of claim 1, wherein the selected library comprises a training corpus for training the machine learning model.

9. A computer system comprising at least one hardware processor configured to:

receive a data package and an unpacking script, the data package combining at least two distinct versions of a robotic process automation (RPA) software module implementing a machine learning model, wherein the data package includes a deduplicated plurality of RPA machine learning libraries, wherein a first version of the RPA software module comprises a first subset of the plurality of RPA machine learning libraries, wherein a second version of the RPA software module comprises a second subset of the plurality of RPA machine learning libraries, wherein the first and second subsets share at least a selected library of the plurality of RPA machine learning libraries, wherein the data package comprises a container image, and wherein each of the plurality of RPA libraries comprises a distinct layer of the container image;

in response, unpack the data package according to the unpacking script to produce at least the first version of the RPA software module; and transfer the first version of the RPA software module to an airgapped RPA host system configured to execute the machine learning model.

10. The computer system of claim 9, wherein:

unpacking the data package further produces the second version of the RPA software module; and wherein the at least one hardware processor is further configured to transfer the second version of the RPA software module to the airgapped RPA host system.

11. The computer system of claim 9, wherein the first version of the RPA software module is configured to execute on processors characterized by a first instruction set architecture (ISA) and wherein the second version of the RPA software module is configured to execute on processors characterized by a second ISA distinct from the first ISA.

12. The computer system of claim 9, wherein the first version of the RPA software module is configured to execute on a central processing unit (CPU) and wherein the second version of the RPA software module is configured to execute on a graphics processing unit (GPU).

13. The computer system of claim 9, wherein the first version of the RPA software module is configured to execute on a central processing unit (CPU) and wherein the second version of the RPA software module is configured to execute on an application-specific integrated circuit (ASIC).

14. The computer system of claim 9, wherein the first version of the RPA software module is configured to execute on RPA hosts having a first operating system (OS), and wherein the second version of the RPA software module is configured to execute on RPA hosts having a second OS distinct from the first OS.

15. The computer system of claim 9, wherein the first version of the RPA software module comprises a first training corpus for training the machine learning model, and wherein the second version of the RPA software module comprises a second training corpus for training the machine learning model, the first training corpus distinct from the second training corpus.

16. The computer system of claim 9, wherein the selected library comprises a training corpus for training the machine learning model.

17. A non-transitory computer-readable medium storing instructions which, when executed by at least one hardware processor of a computer system, cause the computer system to:

receive a data package and an unpacking script, the data package combining at least two distinct versions of a robotic process automation (RPA) software module implementing a machine learning model, wherein the data package includes a deduplicated plurality of RPA machine learning libraries, wherein a first version of the RPA software module comprises a first subset of the plurality of RPA machine learning libraries, wherein a second version of the RPA software module comprises a second subset of the plurality of RPA machine learning libraries, wherein the first and second subsets share at least a selected library of the plurality of RPA machine learning libraries, wherein the data package comprises a container image, and wherein each of the plurality of RPA libraries comprises a distinct layer of the container image;

in response, unpack the data package according to the unpacking script to produce at least the first version of the RPA software module; and transfer the first version of the RPA software module to an airgapped RPA host system configured to execute the machine learning model.

\* \* \* \* \*